Figure 1:
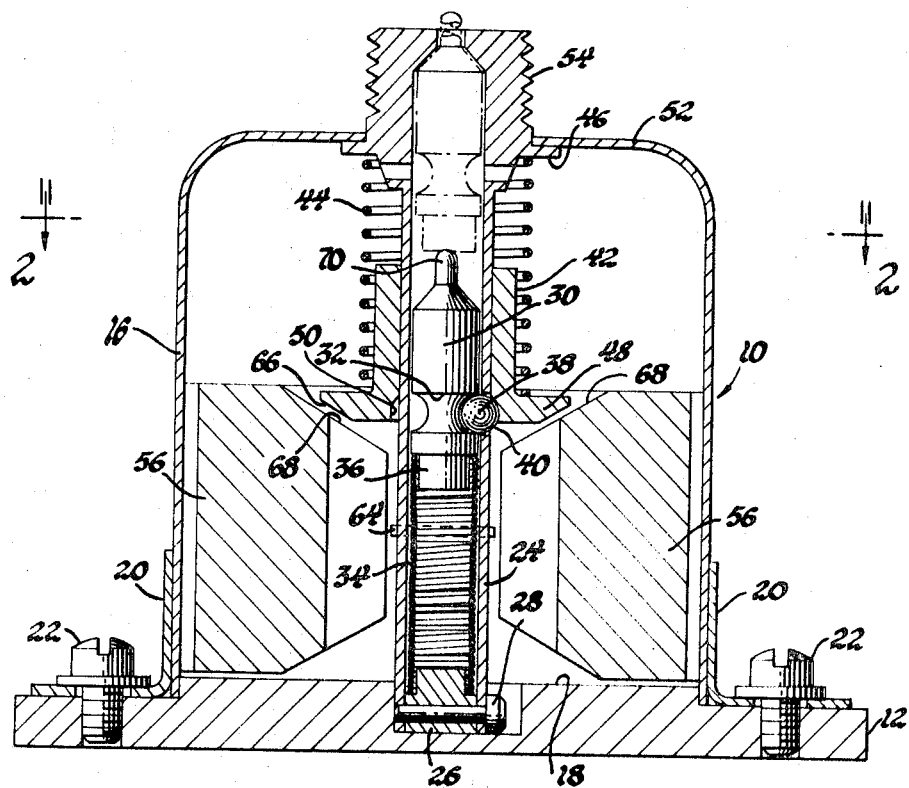

United States Patent

[11] 3,625,178

[72] Inventor Otakar P. Prachar
  Santa Barbara, Calif.
[21] Appl. No. 66,463
[22] Filed Aug. 24, 1970
[45] Patented Dec. 7, 1971
[73] Assignee General Motors Corporation
  Detroit, Mich.

[54] BIDIRECTIONAL SENSOR
  3 Claims, 2 Drawing Figs.
[52] U.S. Cl. ................................................. 116/114,
  9/318, 73/492, 180/103, 222/5
[51] Int. Cl. ....................................................... G01d 21/00
[50] Field of Search ............................................. 116/114,
  114 AH, 124.9, 70, DIG. 42; 73/12, 488, 492; 9/9,
  318, 320; 180/82, 103; 222/3, 5; 200/61.45, 61.52,
  61.53

[56] References Cited
UNITED STATES PATENTS
| | | | |
|---|---|---|---|
| 2,671,832 | 3/1954 | Hansard et al. | 200/61.53 |
| 3,020,875 | 2/1962 | Browning | 116/114 |
| 3,066,202 | 11/1962 | Kaleba et al. | 200/61.5 |
| 3,145,571 | 8/1964 | Maynard et al. | 73/492 |
| 3,369,520 | 2/1968 | Burg et al. | 116/114 |

FOREIGN PATENTS
| | | | |
|---|---|---|---|
| 1,258,947 | 3/1961 | France | 116/114 |

Primary Examiner—Louis J. Capozi
Attorneys—W. E. Finken and Herbert Furman

ABSTRACT: A support has a hollow tubular axial guide mounted on an end wall thereof. An operator is slidably mounted within the guide and spring biased in one axial direction or from normal unactuated position toward actuated position. Balls mounted within openings in the guide wall engage an annular shoulder of the operator to hold the operator in normal position. The balls are held in engagement with the operator shoulder by a cylindrical release member slidably mounted on the outer surface of the guide and spring biased oppositely of the operator and into engagement with the balls. A pair of seismic masses are pivoted to the support for swinging movement radially of the guide about axes located generally parallel of the guide axis. The masses are spring biased apart with respect to each other and radially outwardly of the guide into engagement with sidewalls of the support. Each mass includes a tapered elongated surface normally positioned in adjacent spaced relationship to a conical surface on a flange of the release member. Upon receipt of an acceleration pulse of predetermined amplitude and time directed generally radially of the guide, one of the masses moves radially toward the guide and the camming engagement of the tapered mass surface with the conical surface of the release member moves the release member axially of the guide to release the balls and in turn release the operator.

INVENTOR.
Otakar P. Prachar
BY
Herbert Furman
ATTORNEY

BIDIRECTIONAL SENSOR

This invention relates generally to bidirectional sensors and more particularly to bidirectional sensors having a detented operator released for axial movement from a normal to an actuated position by the swinging movement of one of a plurality of seismic masses through a predetermined arc when subjected to an acceleration pulse of predetermined amplitude and time.

One of the features of the sensor of this invention is that the release means for the operator detent includes a movable release member having an annular conical surface and that each of the seismic masses has a tapered planar surface, at least one of which is engageable with the conical surface of the release member to move the member to released position when the respective mass is subjected to the required acceleration pulse. Another feature of this invention is that the seismic masses are pivoted about axes parallel to the direction of movement of the operator and are biased out of engagement with the release member by threshold spring means. A further feature of this invention is that stop means are provided to limit the swinging movement of the seismic masses relative to the release member.

Figure 2:
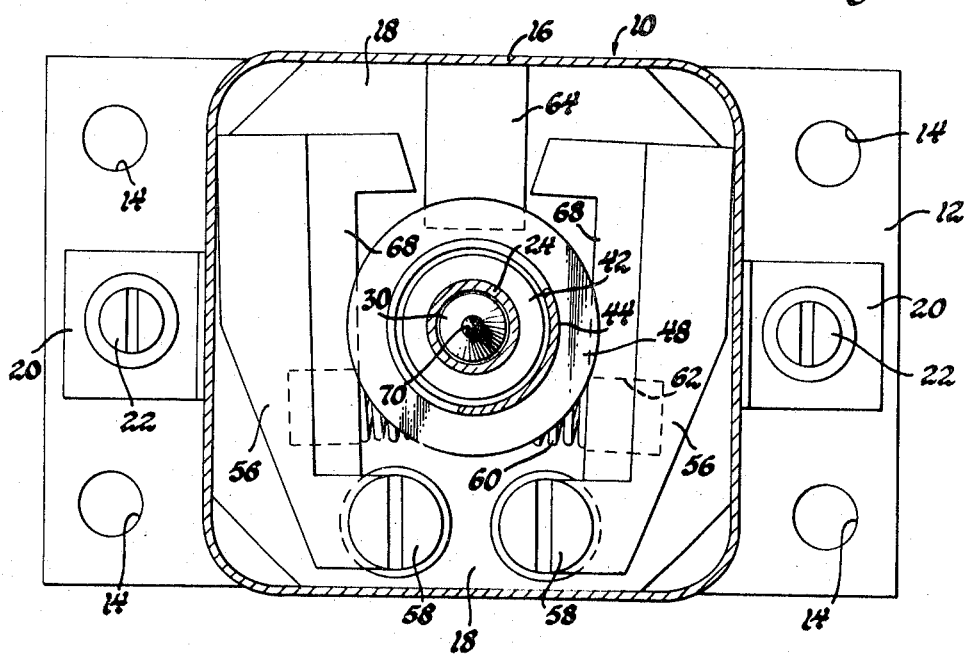

These and other features of the sensor of this invention will be readily apparent from the following specification and drawings wherein:

FIG. 1 is an axial sectional view of a sensor according to this invention, with the sensor being shown in normal or unactuated position; and FIG. 2 is a sectional view taken generally along the plane indicated by line 2—2 of FIG. 1.

Referring now to the drawings, a sensor designated generally 10 according to this invention includes a generally rectangularly shaped baseplate or wall 12 which is multiple apertured at 14 so as to be mounted on a support, such as a vehicle body. A generally square shaped cover 16 fits over a central boss 18 of the plate 12 and includes a pair of angular mounting tabs 20 which are welded to opposite sidewalls of the cover and bolted at 22 to the plate 12.

A cylindrical guide 24 is received over a cylindrical boss 26 secured to the plate 12 and pinned thereto at 28. An operator 30 is slidably mounted within the guide 24 and includes a peripheral groove 32 of semicylindrical cross section. A coil compression spring 34 seats between a reduced diameter end boss 36 of the operator and the boss 26 and normally biases the operator upwardly toward actuated position, shown schematically in FIG. 1. Three balls 38 are freely received within respective openings 40 equally spaced about the circumference of the guide 24 and are engaged with the groove 32, as will be further described, to hold the operator 30 in its normal or unactuated position, as shown in full lines in FIG. 1.

A cylindrical release member 42 is slidably mounted on the exterior of the guide 24 and a spring 44 seating between a flange 46 of the guide and a flange 48 of the member 42 continually biases the member 42 downwardly, or oppositely, of the operator 30, to thereby hold an annular semicylindrically shaped shoulder or groove 50 of the member 42 in engagement with the balls 38 and in turn hold the balls in engagement with the groove 32. Thus the operator is normally detented in its position shown in FIG. 1.

The flange 46 of the guide 24 seats against the inner surface of an end wall 52 of the cover 16. A threaded bushing 54 of the guide extends outwardly through a central aperture in the wall 52 for selective connection to a member to be actuated as will be further described.

A pair of symmetrical generally U-shaped seismic masses 56 each having one leg thereof pivoted at 58 to the plate 12 for movement about generally vertically disposed axes parallel to the axis of guide 24 and the direction of movement of the operator 30. Since the masses are symmetrical, the same mass can be used on each side of the guide tube. A coil compression spring 60 seats within a bore 62 in each of the masses, generally midway between the upper and lower surfaces thereof, to bias the masses apart or radially outwardly of the guide 24 and into engagement with opposite sidewalls of the housing 16 as shown in FIG. 2. A laterally extending tab or finger 64 extends inwardly of the housing 16 and between the masses 56 to limit movement of the masses radially inwardly of the guide 24.

As shown in FIG. 1, the flange 48 of member 42 includes a generally radially and axially extending or conical surface 66 which faces the masses 56 and is located in immediate spaced adjacent relationship to elongated tapered surfaces 68 on the upper wall of each mass.

Normally the spring 60 is of sufficient strength to hold the masses 56 against the sidewalls of the housing 16. However, should one or the other of the masses 56 be subjected to an acceleration pulse of predetermined amplitude and time, directed generally normal to the mass and spaced radially of the mass axis, the one mass will thereupon swing radially inwardly of the guide 24 so that the tapered surface 68 thereof tangentially engages the conical surface 66 of member 42. This engagement and subsequent movement of the mass 56 further radially inwardly of the guide 24 will shift the member 42 upwardly against the action of spring 44. Groove 50 thereupon moves out of engagement with the balls 36 so that the combined action of groove 32 and spring 34 forces the balls 36 outwardly of the openings 40 and releases the operator 30 for movement to its actuated position.

The sensor 10 is particularly intended for use with an air cushion restraint system of a vehicle body. Such system includes a diaphragm-sealed pressure vessel, a manifold connecting the vessel with a diffuser tube, and a cushion inflated by the diffuser tube. Upon movement of the operator 30 to its actuated position, the firing pin 70 thereof may either fire a detonator to rupture the diaphragm of the pressure vessel, close a switch to electrically fire a squib, and in turn rupture the diaphragm, or directly engage and rupture the diaphragm.

The plate 12 is intended to be mounted on a support of body panel which will receive impact shock loads and thereby subject the seismic masses 56 to acceleration pulses. When a pulse of the required amplitude and time is received, the operator 30 will move to its actuated position as previously described.

Thus, this invention provides an improved bidirectional sensor.

I claim:

1. A sensor comprising, a support including an axial guide, an operator mounted on the guide for axial movement relative thereto between normal and actuated positions, detent means engageable with the operator to hold the operator in normal position, detent release means mounted on the guide for axial movement into and out of engagement with the detent means to selectively and alternately hold the detent means in engagement with the operator or release the detent means from engagement therewith, means biasing the release means into engagement with the detent means, a seismic mass pivoted to the support for movement radially of the release means when subjected to an acceleration pulse of predetermined amplitude and time, means normally locating the mass in a predetermined radial position with respect to the detent release means, and cooperating surfaces on the mass and the detent release means for moving the detent release means axially out of engagement with the detent means upon movement of the seismic mass radially of the release means under the acceleration pulse.

2. A sensor comprising, a support including an axial guide, an operator mounted on the guide for axial movement relative thereto between normal and actuated positions, detent means engageable with the operator to hold the operator in normal position, detent release means mounted on the guide for axial movement into and out of engagement with the detent means to selectively and alternately hold the detent means in engagement with the operator or release the detent means from engagement therewith, means biasing the release means into engagement with the detent means, a plurality of seismic masses pivoted to the support for movement radially of the release means when subjected to an acceleration pulse of predetermined amplitude and time, means normally locating the masses in a predetermined radial position with respect to the detect release means, and cooperating cam surfaces on the masses and the detent release means for moving the detent release means axially out of engagement with the detent means upon movement of at least one of the seismic masses radially of the release means under the acceleration pulse.

3. A sensor comprising, a support including an axial guide, an operator mounted on the guide for axial movement relative thereto between normal and actuated positions, detent means engageable with the operator to hold the operator in normal position, a detent release member mounted on the guide for axial movement into and out of engagement with the detent means to selectively and alternately hold the detent means in engagement with the operator or release the detent means from engagement therewith, means biasing the release member into engagement with the detent means, a plurality of seismic masses pivoted to the support member for movement radially of the release member when subjected to an acceleration pulse of predetermined amplitude and time, means normally locating the masses in a predetermined radial position with respect to the detent release member, the release member including a generally axially directed conical surface tangentially engageable by a tapered surface of at least one of the masses for moving the detent release member axially out of engagement with the detent means upon movement of the one seismic mass radially of the release member under the acceleration pulse.

* * * * *